Jan. 18, 1944.    M. PERIAT    2,339,718
BALANCER
Filed Aug. 12, 1940
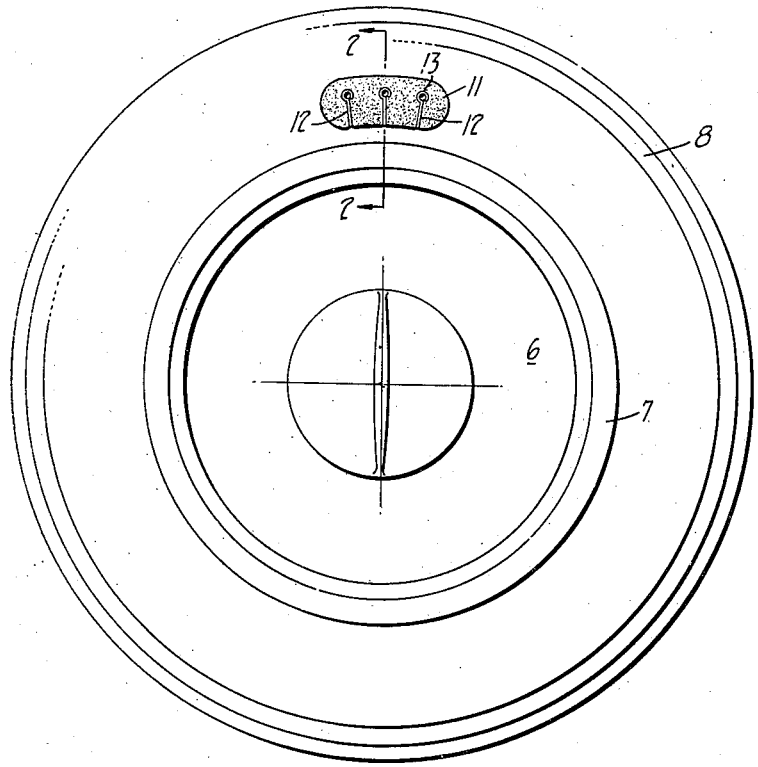
FIG_1_
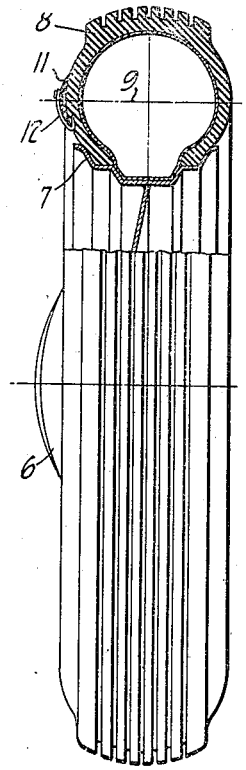
FIG_2_
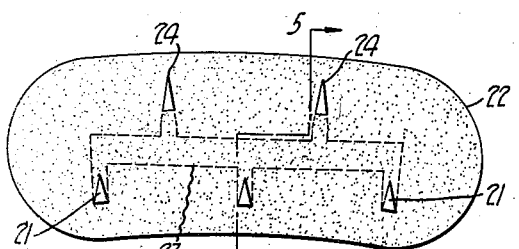
FIG_4_
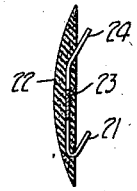
FIG_5_
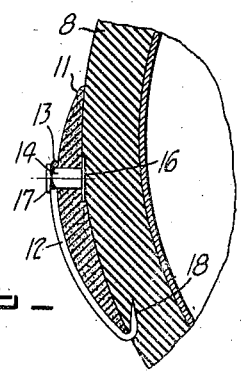
FIG_3_
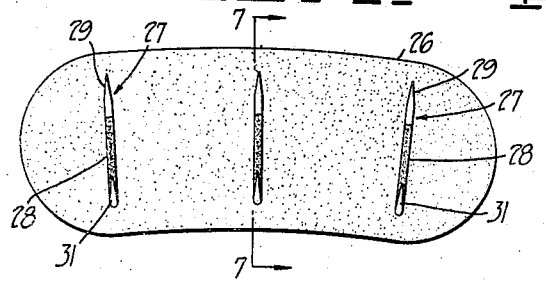
FIG_6_
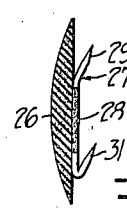
FIG_7_
INVENTOR
Marcel Periat
BY
Marcus Lothrop Patented Jan. 18, 1944

2,339,718

UNITED STATES PATENT OFFICE 2,339,718

BALANCER

Marcel Periat, San Mateo, Calif.

Application August 12, 1940, Serial No. 352,303

2 Claims. (Cl. 152—330)

My invention relates to means for balancing rotating bodies and particularly such bodies having a relatively soft portion, such as a tire casing, thereupon.

It is recognized that in order to balance rotating bodies, especially wheel assemblies having tire casings thereupon, additional weight must be affixed thereto. This has resulted in the provision of various different types of weights, some metallic and others flexible and often of rubber, which are secured to the rotatable wheel assembly. The method of attaching such weights or the manner of applying them presents some difficulties since cement, vulcanizing and the like entail the use of considerable time and do not always provide a sufficiently secure attachment to resist the tremendous dislodging forces involved.

It is therefore an object of my invention to provide a balancer which can be applied in a very short time.

Another object of my invention is to provide a balancer which can be readily affixed to a wheel assembly yet which is firmly engaged thereto.

Another object of my invention is to provide a method of affixing a balancer to a rotatable wheel so that the balancer is very firmly fixed even though but little manual force is utilized.

The foregoing and other objects are attained in the embodiment of the invention illustrated in the drawing, in which Fig. 1 is a side elevation of a wheel assembly with a balancer in accordance with my invention applied thereto;

Fig. 2 is a side elevation of the structure of Fig. 1, a portion being shown in cross-section, the plane of which is indicated by the line 2—2 of Fig. 1;

Fig. 3 is an enlarged view, similar to Fig. 2, showing in greater detail a balancer affixed in accordance with my invention;

Fig. 4 is an interior elevation of a balancer of modified form;

Fig. 5 is a cross-section the plane of which is indicated by the line 5—5 of Fig. 4;

Fig. 6 is an elevation of a balancer of further modified form; and

Fig. 7 is a cross-section the plane of which is indicated by the line 7—7 of Fig. 6.

In its preferred form, the balancer of my invention comprises a weight adapted to be affixed to a tire casing or comparable penetrable material by means of sharp tines or projections incorporated with the weight. The method includes the initial positioning of a tined weight adjacent a penetrable or puncturable material, such as a tire casing to be balanced, with the tines partially engaging such material, then rotating the body rapidly so that the resulting centrifugal force drives the tines into firmly embedded position and firmly holds the weight in location.

While the balancer and method of my invention are not only useful in connection with wheel assemblies, they are particularly adaptable to such use and hence are described in connection therewith.

A wheel assembly ordinarily includes a wheel 6, having a rim 7 affixed thereto, and upon which a tire casing 8 is mounted. The casing ordinarily includes a fabric interior which is coated with rubber or comparable pierceable material, and takes the shape in cross-section substantially of a circle. The greatest axial dimension of the casing is substantially indicated by a line 9 in Fig. 2, and radially inward of such line the tire casing is decreased in axial dimension, and radially outward of such line the tire casing is decreased in axial dimension.

In accordance with my invention, the wheel assembly is tested for unbalance in a well known manner and is to receive a balancer or balancers of the type shown herein. In a preferred form, each balancer includes a pad or body 11 which is primarily a weight and is chosen for its particular mass or weight. The body 11 is flexible and is conveniently fabricated of rubber of a contour suitable to concentrate the mass, and preferably has feathered or tapered edges in order to merge relatively smoothly with the casing to which it is to be attached. The flexibility of the pad 11, however, is at least equal to that of the casing 8 so that the pad partakes of the movements of such casing as the wheel assembly operates.

In order to affix such pad or weight 11 to the casing 8, I preferably provide one and sometimes a plurality of hooks or tines 12. In one instance each of these is composed of a bent wire having an eye 13 at one end, which is secured to the pad 11 by a rivet 14 passing therethrough and having an enlarged head 16 on the side next to the casing 8 and a turned-over bead 17 on the exterior, so that while the hook 12 can rotate slightly about the body of the rivet 14 it cannot separate from the pad 11. The other end of the hook wire 12 is reversely bent and is provided with a sharpened point 18 which readily penetrates the material, whether rubber or fabric or both, of the tire casing 8. Such penetration, however, is not entirely through the casing. In the event a plurality of hooks 12 are utilized, they are spaced apart in a circumferential direction on the pad 11 so that each of them can move with respect to the others, not only about its individual rivet but in other directions as well since the hooks are connected only by the interposed flexible rubber of the pad. Furthermore, the hooks are movable slightly toward and away from each other in order to accommodate themselves automatically to the casing to which they are applied.

In accordance with my invention, the method of applying the balancer is to determine first the location to which a balancer should be applied in accordance with any well known method and, while the wheel assembly is stationary, manually to apply the weight 11 thereto in such location and start the tines or hooks 18 into position by slightly piercing the tire casing 8 therewith. As soon as the weight is thereby partially engaged in position, the wheel assembly is rotated rapidly, whereupon the centrifugal force due to such rotation, acting upon the weight 11, tends to cause it to move radially outward of the wheel assembly, thereby embedding the hooks 12 as firmly as possible in the casing 8 and causing the pad 11 to seat firmly against the wall of the casing 8. In order to get the best results, preferably the hooks 18 and also the pad 11 are located radially inward of the maximum axial dimension 9 of the casing. Balancers which have been applied in accordance with this method, although entirely flexible and able to yield in company with the casing 8, are firmly affixed and are relatively immovable for all practical purposes. In the event, however, that the wheel assembly is altered or that the balance weight should be moved to a different location, it is possible, when the wheel assembly is not rotated, to disengage the hooks 11 from the tire casing and to reinstall the same unit in a different location or to install the balancer on a different assembly. Yet in service there is no dislodgment of the balancer and it has the attribute of adhering more tightly to the casing the faster the assembly rotates.

The exact mechanical form of the balancer shown in Figs. 1, 2 and 3 need not be adhered to, for in Figs. 4 and 5 there is shown a somewhat different form in which all of the tines 21 of the balancer 22 are integral with a continuous strip 23 extending longitudinally of the balancer. The strip 23 is preferably embedded in the material of the pad for a better appearance and a firmer bond, and, instead of utilizing only reversely turned tines or hooks, as in the first instance, the strip 23 not only has the reversely turned hooks 21 but also has tines or hooks 24 each of which makes an obtuse angle with the main body of the strip 23 instead of an acute angle therewith. The general operation and use of this form is substantially the same as in connection with the first modification.

As an additional modification, in Figs. 6 and 7 there is shown a form in which the pad 26 is provided with a plurality of hook members 27 each of which includes a central body 28 of metal directly vulcanized to the material of the pad 26, usually rubber, and which central member has an upper tine 29 projecting therefrom at an obtuse angle and a lower tine 31 projecting therefrom at an acute angle. But the various bodies 28 of the successive hooks are not joined, and hence this form has substantially the same flexibility as the first form, whereas the second form is usually somewhat stiffer. The method of operation with the forms shown in Figs. 4 and 6 is substantially the same as that with the form shown in Fig. 1.

I claim:

1. A balancer adapted to be attached to a mounted inflated tire casing comprising a flat weight adapted to lie against the side wall of the casing, and sharp hooks fastened to and lying at an acute angle to the weight adapted to penetrate the side wall of the casing to hold the weight against dislodgment by centrifugal force.

2. A balancer adapted to be attached to a mounted inflated tire casing comprising a flat weight adapted to lie against the side wall of the casing, and sharp diverging projections adapted to penetrate the side wall of the casing, secured to said weight and disposed at an acute angle thereto.

MARCEL PERIAT.